Sept. 8, 1959

L. T. WRIGHT 2,902,885

VALVE CONTROL MECHANISM

Filed May 31, 1955

INVENTOR.
Lawrence T. Wright
BY
Byron A. Vance
ATTORNEY

United States Patent Office 2,902,885
Patented Sept. 8, 1959

2,902,885

VALVE CONTROL MECHANISM

Lawrence T. Wright, Homewood, Ill., assignor to Standard Oil Company, Chicago, Ill., a corporation of Indiana Application May 31, 1955, Serial No. 511,996

5 Claims. (Cl. 74—625)

This invention relates to a mechanism for controlling flow through a valve. More particularly, it pertains to motor-operated valves in which both sensitive control and rapid opening or closing characteristics are required.

In some applications of motor-operated valves for throttling service, the problem of selecting the motor to provide both sensitive control and rapid closing of the valve is encountered. In many cases of this type, it is impossible to size correctly the operating motor, since the powerful motor required for rapid closing has too much inertia for sensitive control. It is an object of this invention to provide a valve control mechanism which will provide both sensitive control of the valve under normal operating conditions and instantaneous opening or closing of the valve under normal operating conditions or during emergencies.

There also exists a problem in insuring valve tightness in the closed position when the control mechanism must necessarily be positioned some distance from the valve. This is particularly true when the control valve and a substantial length of the valve stem are positioned in a relatively large vessel which is subjected to heating and cooling. Large differential thermal expansion between the valve elements and the vessel quite often occurs due to their different rates of heating or cooling and it becomes difficult to maintain uniform valve seating pressure. A further object of this invention is to provide a valve control mechanism which will provide a uniform seating pressure at all times when the valve is closed. Another object is to provide a mechanism which can be adjusted easily to alter the magnitude of the seating pressure on a valve when it is closed. These and other objects will become apparent to those skilled in the art as the description of the invention proceeds.

In accordance with my invention, a control rod, which is preferably the valve stem itself, is threaded to engage the internal threads of a splined nut, the length of the nut being at least equal to the distance of travel of the rod from fully open to fully closed valve position. For sensitive control, a worm driven gear is slidably mounted on the splined nut and keyed or splined thereto, the worm for the gear being journaled in fixed position and preferably motor driven. For quick opening or shut off, the splined nut is operatively connected to a piston instantaneously movable through said travel distance by pneumatic, hydraulic or electrical action which is more rapid than could be attained by ordinary mechanical operating mechanisms. The pneumatic, hydraulic or electrical actuation of the piston enables control and/or maintenance of constant valve seating pressure without the necessity of employing springs or other cumbersome mechanical devices.

In the drawings referred to below, I have shown a preferred embodiment of my invention, it being understood that this is by way of example only.

Figure 2:
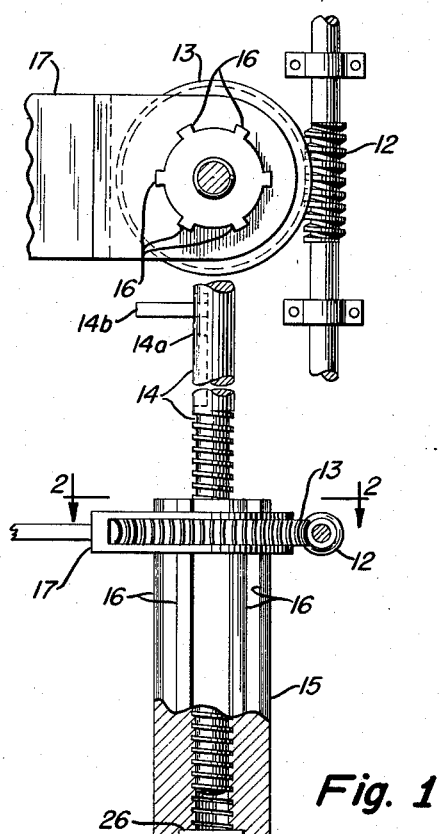
Figure 2 is a horizontal section taken along the line 2—2 of Figure 1.
Figure 1:
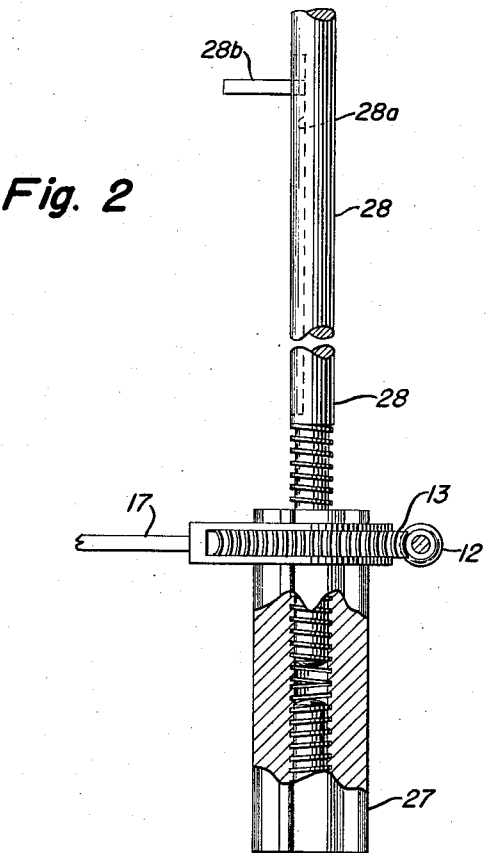
Figure 1 is a schematic, partially sectioned elevation of the valve control mechanism.

Referring to Figure 1, a hydraulic or pneumatic cylinder shut-off operator 11 is provided to instantaneously open or close a valve (not shown). This operator may be selected for any closing speed desired and by proper adjustment of the pressure in the cylinder optimum valve seating pressure may be attained. Cylinder 11 is a two-position operator which will be in the operating position shown during normal control operation of the valve.

Sensitive control of the valve at any point intermediate the fully open and fully closed position is achieved through a motor (not shown) which turns the journaled worm 12 shown in the drawing. Turning the worm 12 causes the worm gear 13 to rotate about the axis of the control rod 14 which in turn causes the nut 15 to rotate. Splines 16 are provided to impart the rotary motion of the worm gear 13 to the nut 15 and to permit sliding of the nut 15 through the worm gear 13 when the shut-off cylinder 11 is actuated to instantaneously close or open the valve. A bearing and support 17 is provided to maintain the worm gear 13 in a fixed position with respect to the longitudinal motion necessary to open and close the valve and allows the worm gear 13 to rotate freely. The inner threads of the splined nut 15 engage the threads on control rod 14. Thus the rotary motion imparted to splined nut 15 causes the control rod 14 to move in a longitudinal direction thus varying the relative opening of the valve (not shown). The control rod is provided with a key 14b and keyway 14a or spline or the like to permit free longitudinal movement but to prevent rotational movement of the rod. The splined nut 15 is free to move longitudinally in the splined worm gear 13 so that the operation of the shut-off cylinder 11 is not dependent upon the position of the splined nut 15.

As shown in Figure 1, the valve is fully open by virtue of the position of piston 18 in cylinder 19 and by virtue of the retraction of control rod 14 completely within the splined nut 15. The valve may be readily closed by moving piston 18 in cylinder 19 by pressuring line 21 from pressure source 22 through valve 23, which valve simultaneously provides for releasing the pressure on line 24. This causes the stem 25 to impart longitudinal motion to the splined nut 15 which in turn moves the control rod 14 in a longitudinal direction and closes the valve. In some instances, it may be desirable to cushion the shock caused by rapid closing of the valve. The apparatus described herein is readily adaptable to provide such cushioning; for instance, a shock absorber could be mounted on the control rod 14 and be activated by striking a member immediately before the valve seats. Other means of accomplishing this result will be apparent to those skilled in the art.

In the closed position, the pressure source 22 applies constant pressure to the piston 18 and consequently to the valve; thus mechanical springs or the like are not required to maintain constant seating pressure on the valve as a result of differential thermal expansion between the valve assembly and vessel in which it may be placed. In addition, the magnitude of the seating pressure may be easily adjusted by altering the pressure of the pressure supply source 22 to any appropriate value. Ability to vary the seating pressure is of particular value when the control valve is used in pressure vessels, since the net force on the valve, due to pressure differences across the valve, can act either with or in opposition to the valve seating force depending upon the relative magnitudes of the pressures in the vessels served by the valve.

To open the valve, after it has been closed as hereinbefore described, it is merely necessary to release the pressure on line 21 and increase the pressure in the cylinder through line 24 from pressure supply source 22 by means of the valve 23. This causes the stem 25 to move the nut 15 which in turn causes the control rod 14 to move in a longitudinal direction and open the valve. The valve is then in operating position and flow through the valve may be throttled by causing the splined nut 15 to turn and move control rod 14. The shut-off operator 11 may be activated at any time to close the valve irrespective of the longitudinal position of control rod 14.

Figure 3:
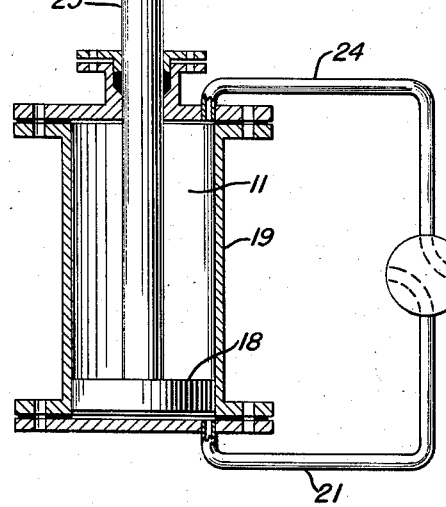
Figure 3 illustrates another form of linking the shut-off cylinder and the splined nut.

In Figure 1 the stem 25 is connected to the splined nut 15 by means of a journal 26. Other forms of operatively connecting the stem and the nut may be used. In Figure 3, one such method of connecting the stem and nut is shown. In this form, the splined nut 27 is internally threaded for half its length with a right hand thread and for the other half of its length with a left hand thread. The threads in one half of the nut engage the threaded control rod 28 and in the other half of the nut the threads engage threads on the stem 29 connected to a piston 31 which may be hydraulically, pneumatically or electrically operated. Sensitive control of the valve is achieved by rotating the splined right and left nut 27. This nut, by virtue of the combination of right and left hand threads, when rotated by the worm 12 and worm gear 13 causes the control rod 28 to move in a longitudinal direction with respect to nut 27 and causes the nut 27 to move in a longitudinal direction with respect to the stem 29, thus sliding through the worm gear 13; the stem 29 is attached to the piston 31 and is thereby held in a fixed longitudinal position during such sensitive control operation. The control rod 28 and stem 29 are provided with keys 28b and 29b respectively and keyways 28a and 29a respectively or the like to allow free longitudinal movement while preventing rotational movement. The nut 27 is free to slide in the splined worm gear 13 as hereinbefore described so that the operation of the piston 31 is not dependent on the position of the nut 27.

The length of the nut 15 as shown in Figure 1, and the nut 27 as shown in Figure 3 must be at least equal to the distance of travel of the control rod from fully open to fully closed valve position. As is readily apparent from the drawings, when the valve has been fully opened by the motor (not shown) attached to the worm 12, complete closure of the valve by the shut-off piston will cause the splined nut 14 or 27 to move a distance equal to the distance of travel of the control rod from fully open to fully closed valve position.

While specific examples of the invention have been described in some detail, alternative and supplemental arrangements and mechanisms will be apparent from the above description to those skilled in the art. Stops or limiting means may be provided to prevent contact of the control rod and stem and to prevent complete disengagement of the nut from the rod and stem. Instead of employing a worm gear and driving worm, equivalent drive mechanisms (e.g. pinion gears, chain and sprocket drives, etc.) may be employed for rotating the splined nut. Stem 25 may be threaded in splined nut 15 with threads which are directionally the same as threads on rod 14 but which are of different pitch. When an electromagnetic drive is employed instead of a pneumatic or hydraulic drive, piston 31 may be a magnetic core which is moved and held downwardly by energizing solenoid 32 and which may be moved upwardly and held in upward position by deenergizing solenoid 32 and energizing solenoid 33, the stem 29 immediately above the solenoid in this case being of non-magnetic material, such as austenitic stainless steel and said stem being keyed to permit the required vertical motion while preventing rotational motion.

I claim:

1. A valve control mechanism which comprises a threaded reciprocally movable control rod, a spline on said rod to prevent rotational movement of said rod, a splined nut having a first end and a second end whose inner threads on said first end engage the threads of said rod, means including an element slidably mounted on said splined nut for rotating said nut, an element operatively connected to said second end of said nut, and a controlled energy source for instantaneously moving said operatively connected element and said nut connected thereto toward and away from an ultimate position and for holding said operatively connected element in fixed position with respect to said rotating means when in said ultimate position and when away from said ultimate position.

2. A valve control mechanism which comprises a threaded reciprocally movable control rod, a spline on said rod to prevent rotational movement of said rod, a splined nut having a first end and a second end whose inner threads on said first end engage the threads on said rod, a worm gear slidably mounted on said nut and splined thereto, a worm journaled for rotating in fixed position for driving said gear, an element operatively connected to said second end of said nut, and a controlled energy source for instantaneously moving said element and said nut connected thereto toward and away from an ultimate position and for holding said element in fixed position with respect to the worm gear when in said ultimate position and when away from said ultimate position.

3. The mechanism of claim 2 wherein the energy source is a fluid drive.

4. The mechanism of claim 2 wherein the energy source is an electromagnetic drive.

5. A valve control mechanism which comprises a threaded reciprocally movable control rod, a spline on said rod to prevent rotational movement of said rod, a splined nut having a first end and a second end provided with inner threads for about half of its length from said first end and provided with inner threads of opposite pitch for the remainder of its length, the inner threads of said first end of said nut engaging the threads of said control rod, a worm gear slidably mounted on said nut and splined thereto, a worm journaled for rotating in fixed position for driving said gear, a stem connected to said second end of said nut by means of threads which engage the threads in said nut, a piston operatively connected to said stem, and a controlled energy source for instantaneously moving said piston, said stem connected to said position and said nut connected to said stem toward and away from an ultimate position and for holding said piston in fixed position with respect to the worm gear when away from said ultimate position.

References Cited in the file of this patent

UNITED STATES PATENTS

| 740,882 | Locke | Oct. 6, 1903 |
| 902,096 | Love | Oct. 27, 1908 |
| 1,806,304 | Mueller | May 19, 1931 |

FOREIGN PATENTS

| 283,437 | Great Britain | Jan. 12, 1928 |